US012662581B2

(12) United States Patent
Lustiger et al.

(10) Patent No.: US 12,662,581 B2
(45) Date of Patent: Jun. 23, 2026

(54) METHOD FOR MANUFACTURING A COPPER-CONTAINING POLYURETHANE FOAM

(71) Applicant: MedCu Technologies Ltd., Herzliya (IL)

(72) Inventors: Danny Lustiger, Herzliya (IL); Gadi Borkow, Givaton (IL)

(73) Assignee: MedCu Technologies Ltd., Herzliya (IL)

(*) Notice: Subject to any disclaimer, the term of this patent is extended or adjusted under 35 U.S.C. 154(b) by 809 days.

(21) Appl. No.: 17/926,613

(22) PCT Filed: May 23, 2021

(86) PCT No.: PCT/IL2021/050598
§ 371 (c)(1),
(2) Date: Nov. 20, 2022

(87) PCT Pub. No.: WO2021/240507
PCT Pub. Date: Dec. 2, 2021

(65) Prior Publication Data
US 2023/0203260 A1 Jun. 29, 2023

Related U.S. Application Data

(60) Provisional application No. 63/029,501, filed on May 24, 2020.

(51) Int. Cl.

| | |
|---|---|
| ***C08G 18/48*** | (2006.01) |
| ***C08G 18/08*** | (2006.01) |
| ***C08J 9/00*** | (2006.01) |
| ***C08K 3/08*** | (2006.01) |
| ***C08K 3/16*** | (2006.01) |
| ***C08K 3/22*** | (2006.01) |
| *C08G 101/00* | (2006.01) |

(52) U.S. Cl.
CPC ............ *C08J 9/0066* (2013.01); *C08G 18/14* (2013.01); *C08G 18/4833* (2013.01); *C08K 3/08* (2013.01); *C08K 3/16* (2013.01); *C08K 3/22* (2013.01); *C08G 2101/00* (2013.01); *C08G 2110/0008* (2021.01); *C08J 2375/04* (2013.01); *C08K 2003/085* (2013.01)

(58) Field of Classification Search
CPC ........................... C08G 18/14; C08G 18/4825; C08G 18/4833; C08G 18/73; C08G 18/755; C08G 18/7621; C08G 18/7671; C08G 2101/00; C08G 2110/00; C08G 2110/0008; C08J 9/0061; C08J 9/0066; C08J 2375/04; C08J 2400/10; C08K 3/015; C08K 3/08; C08K 3/16; C08K 3/22; C08K 2003/085; C08K 2003/2248
See application file for complete search history.

(56) References Cited

U.S. PATENT DOCUMENTS

2015/0373989 A1 12/2015 Krasnow et al.
2018/0371199 A1* 12/2018 Hayashi ................ C08G 18/12

FOREIGN PATENT DOCUMENTS

GB 2561573 A 10/2018
WO 2015076840 A1 5/2015

OTHER PUBLICATIONS

Pulutan et al; "Antimicrobial Activity of Copper Sulfate and Copper Oxide Embedded on Polyurethane Foam", Materials Science Forum, vol. 917, pp. 22-26. (2018).
Sportelli et al; "Investigation of Industrial Polyurethane Foams Modified with Antimicrobial Copper Nanoparticles", Materials, vol. 9, 544 .(2016).
Ashjari et al; "Starch-based polyurethane/CuO nanocomposite foam: Antibacterial effects for infection control" International Journal of Biological Macromolecules vol. 111, pp. 1076-1082. (2018).
PCT Search Report for International Application No. PCT/IL2021/050598, mailed Sep. 10, 2021, 5 pp.
PCT Written Opinion for International Application No. PCT/IL2021/050598, mailed Sep. 10, 2021, 7 pp.

* cited by examiner

*Primary Examiner* — John M Cooney
(74) *Attorney, Agent, or Firm* — The Roy Gross Law Firm, LLC; Roy D. Gross

(57) ABSTRACT

A manufacturing method described in the present invention provides antimicrobial copper-containing polyurethane foams by embedding microparticles of metallic copper (Cu), cuprous oxide ($Cu_2O$), cupric oxide (CuO), or cuprous iodide (CuI), or combinations thereof, into polyurethane foams, wherein said microparticles are homogenously distributed throughout the formed polymeric matrix of said foam. The method combines these copper-containing microparticles, or polyurethane liquid additive containing these particles, mixed in polyol with isocyanate.

12 Claims, 5 Drawing Sheets x330

| | | |
|---|---|---|
| Volt | : | 20.00 kV |
| Mag. | : | x 330 |
| Date | : | 2020/03/11 |
| Pixel | : | 1280 x 960 |

Acquisition Condition

| | | |
|---|---|---|
| Instrument | : | 6510(LA) |
| Volt | : | 20.00 kV |
| Current | : | --- |
| Process Time | : | T4 |
| Live time | : | 28.34 sec. |
| Real Time | : | 30.72 sec. |
| DeadTime | : | 8.00 % |
| Count Rate | : | 4185.00 CPS |

| Formula | mass% | Atom% | Sigma | Net | K ratio | Line |
|---|---|---|---|---|---|---|
| C | 63.27 | 70.44 | 0.03 | 188134 | 0.0502394 | K |
| O | 34.91 | 29.18 | 0.13 | 43430 | 0.0529985 | K |
| Cu | 1.81 | 0.38 | 0.05 | 4586 | 0.0094992 | K |
| Total | 100.00 | 100.00 | | | | |

x3000

Volt : 20.00 kV
Mag. : x 3,000
Date :
2020/03/11
Pixel : 1280 x
960

Acquisition Condition
Instrument : 6510(LA)
Volt : 20.00 kV
Current : ---
Process Time : T4
Live time : 30.00
sec.
Real Time : 32.26
sec.
DeadTime : 6.00 %
Count Rate : 3213.00
CPS

METHOD FOR MANUFACTURING A COPPER-CONTAINING POLYURETHANE FOAM

CROSS REFERENCE TO RELATED APPLICATIONS

This application is a National Phase of PCT Patent Application No. PCT/IL2021/050598 having International filing date of May 23, 2021, which claims the benefit of priority of U.S. Provisional Patent Application No. 63/029,501, filed May 24, 2020, the contents of which are all incorporated herein by reference in their entirety.

TECHNICAL FIELD

In general, the present invention relates to the field of antimicrobial materials. In particular, the present invention relates to a method for manufacturing copper-containing antimicrobial polyurethane foams.

BACKGROUND

Caring for wounds effectively is a top concern for hospitals, particularly in today's climate of lifestyle-related chronic diseases, such as diabetes, and rising geriatric population. Wound dressing original equipment manufacturers (OEMs) and contract manufacturers require the ability to produce wound care dressings that prevent infection and are durable, conformable as well as comfortable for the patient. They often turn to copper, copper oxide and copper salts as an antimicrobial agent, but that does not come without problems.

One of the questions that wound dressing OEMs and contract manufacturers has difficulty to answer is how to include the right antimicrobial materials in their wound dressings, and how can they ensure that the copper-containing materials they choose meet medical standards as well as create patient satisfaction.

Fortunately, polyurethane foams containing copper-oxide microparticles exist to ensure hospitals can reduce infection rates while meeting demands of the increasing need for wound care. Such copper-oxide containing hydrophilic flexible polyurethane foams have been proven to be an ideal solution for antimicrobial dressings, with a very quick antimicrobial action and long-term efficacy.

Pulutan et al in "*Antimicrobial Activity of Copper Sulfate and Copper Oxide Embedded on Polyurethane Foam*", Materials Science Forum, Vol. 917, pp. 22-26 (2018) describes $CuSO_4$- and CuO-deposited polyurethane foams (PUF) fabricated by depositing copper sulphate on PUF via a dipping and pressing technique. Pressing of the PUF was done to ensure the removal of air from the foam cavities, thereby allowing copper ions from the solution to enter these cavities. For the CuO-deposited sample, the same process was repeated but an additional step of soaking in a sodium hydroxide solution on a heat bath of 70° C. was added, so that the sodium hydroxide reacts with the copper ions to form a copper hydroxide precipitate, which is meta-stable and oxidizes to copper oxide.

Sportelli et al in "Investigation of Industrial Polyurethane Foams Modified with Antimicrobial Copper Nanoparticles", Materials, Vol. 9, 544 (2016), described antimicrobial copper nanoparticles that were electrosynthetized and applied to the controlled impregnation of industrial polyurethane foams used as padding in the textile production or as filters for air conditioning systems.

SUMMARY

The present invention describes embodiments of a method for manufacturing antimicrobial copper-containing polyurethane foams by embedding microparticles of metallic copper (Cu), cuprous oxide ($Cu_2O$), cupric oxide (CuO), or cuprous iodide (CuI), or combinations thereof, into polyurethane foams, wherein said microparticles are homogenously distributed throughout the formed polymeric matrix of said foam. In one embodiment of the present invention, the method comprises the following steps:

- Ia. Providing microparticles of metallic copper (Cu), cuprous oxide ($Cu_2O$), cupric oxide (CuO), or cuprous iodide (CuI), or combinations thereof, having size of 100 nm to 5 μm, and alkylammonium salt copolymer; or
- Ib. Providing a polyurethane liquid additive obtained according to the following steps:
  - A. Mixing dried microparticles of metallic copper (Cu), cuprous oxide ($Cu_2O$), cupric oxide (CuO), or cuprous iodide (CuI), or combinations thereof, having size of 100 nm to 5 μm with alkylammonium salt copolymer and polyol to a final concentration in the range of about 5-80% w/w of Cu, $Cu_2O$, CuO or CuI, or combinations thereof, to produce a suspension of the copper-containing microparticles in polyol;
  - B. Stirring said suspension to obtain a dispersion of the copper-containing microparticles in polyol; and
  - C. Cooling the dispersion and drying it by evaporating air from said dispersion in vacuum, thereby forming a semi-solid concentrate of a polyurethane liquid additive;
- II. Mixing said microparticles of Cu, $Cu_2O$, CuO, or CuI, or combinations thereof, and alkylammonium salt copolymer of Step (Ia), or said polyurethane liquid additive obtained in Step (Ib), with a polyol to any 2× desired final concentration of Cu, $Cu_2O$, CuO or CuI; and
- III. Introducing isocyanate into the resulted polyol mixture of Step (II), thereby forming a stable polyurethane foam, in which the microparticles of Cu, $Cu_2O$, CuO or CuI, or combinations thereof, are homogenously embedded and distributed throughout the formed polymeric matrix of said foam.

Various embodiments may allow various benefits, and may be used in conjunction with various applications. The details of one or more embodiments are set forth in the accompanying figures and the description below. Other features, objects and advantages of the described techniques will be apparent from the description and drawings and from the claims

BRIEF DESCRIPTION OF THE DRAWINGS

Disclosed embodiments will be understood and appreciated more fully from the following detailed description taken in conjunction with the appended figures. The drawings included and described herein are schematic and are not limiting the scope of the disclosure. It is also noted that in the drawings, the size of some elements may be exaggerated and, therefore, not drawn to scale for illustrative purposes. The dimensions and the relative dimensions do not necessarily correspond to actual reductions to practice of the disclosure.

FIG. 1*a*: x33 magnification,

FIG. 1*b*: x45 magnification with focus on upper surface and high contrast,

FIG. 1*c*: x45 magnification with focus on upper surface,

FIG. 1*d*: x45 with focus on bottom surface.

DETAILED DESCRIPTION

Figure 1A:
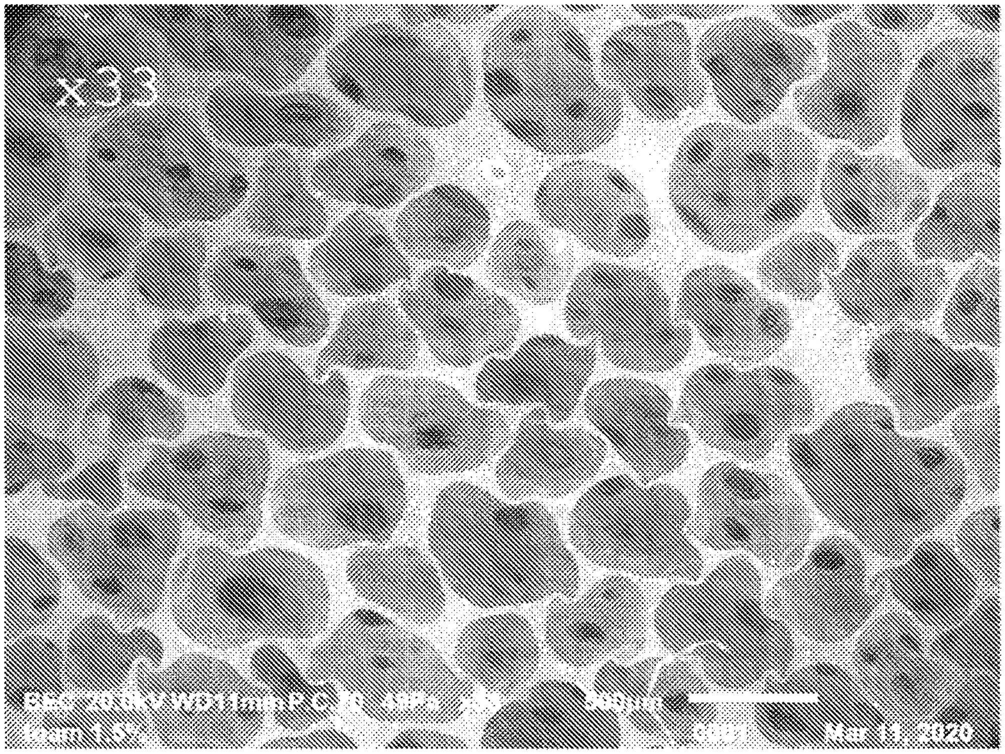
FIGS. 1*a*-1*d* show the scanning electronic microscope (SEM) images of the copper-impregnated foam manufactured by the method of the present invention, at four different magnifications.
Figure 1B:
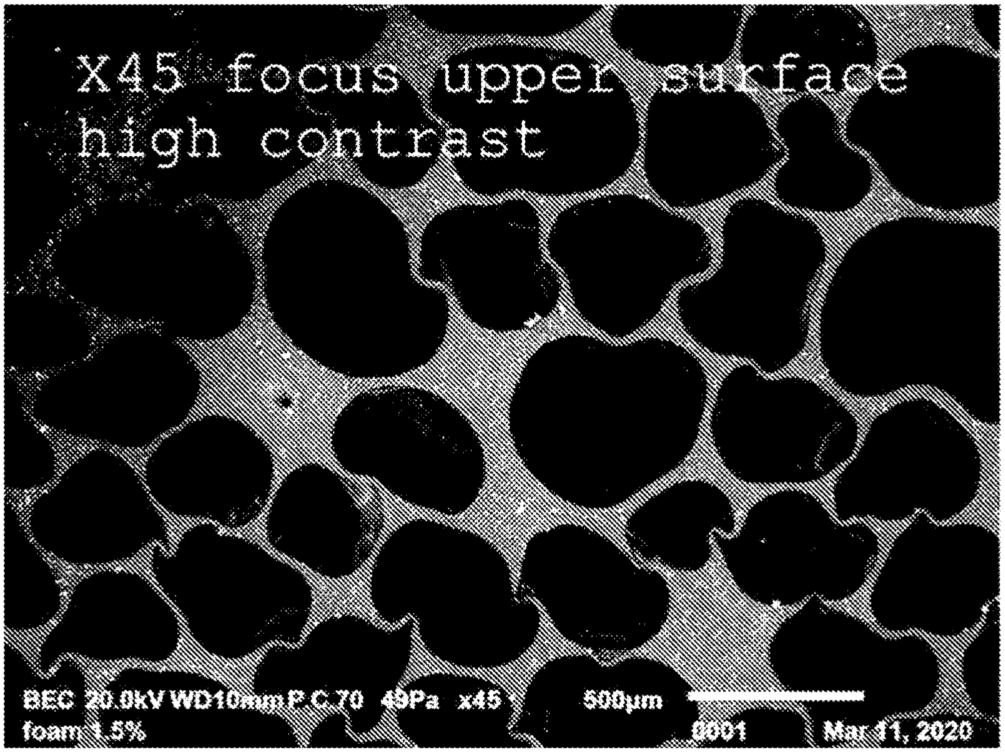
Figure 1C:
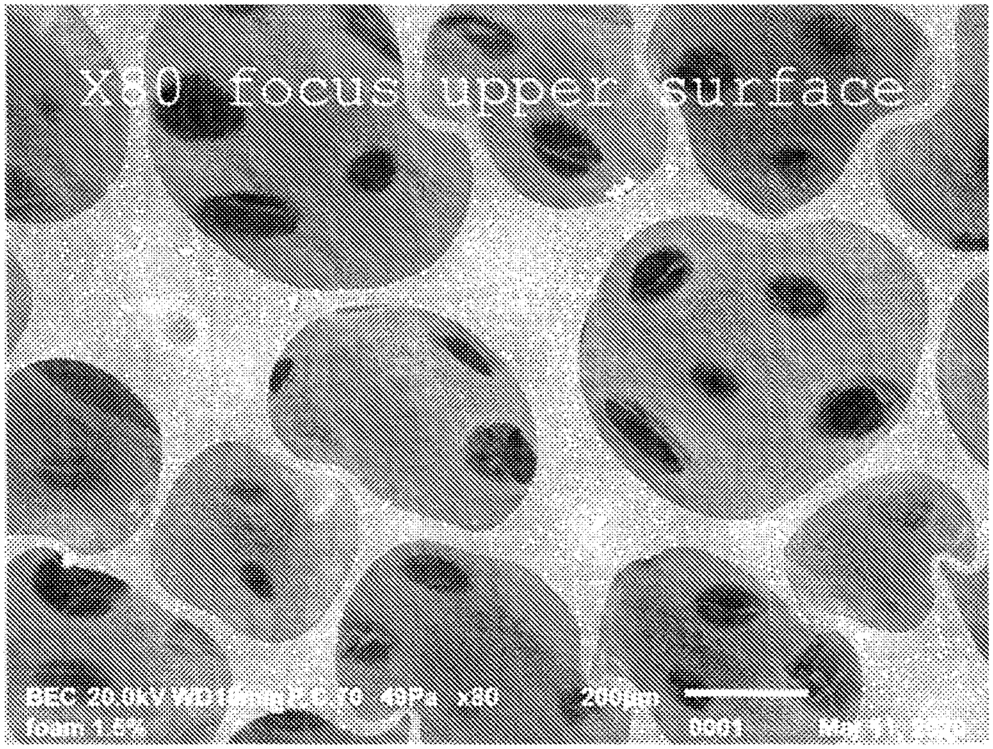
Figure 1D:
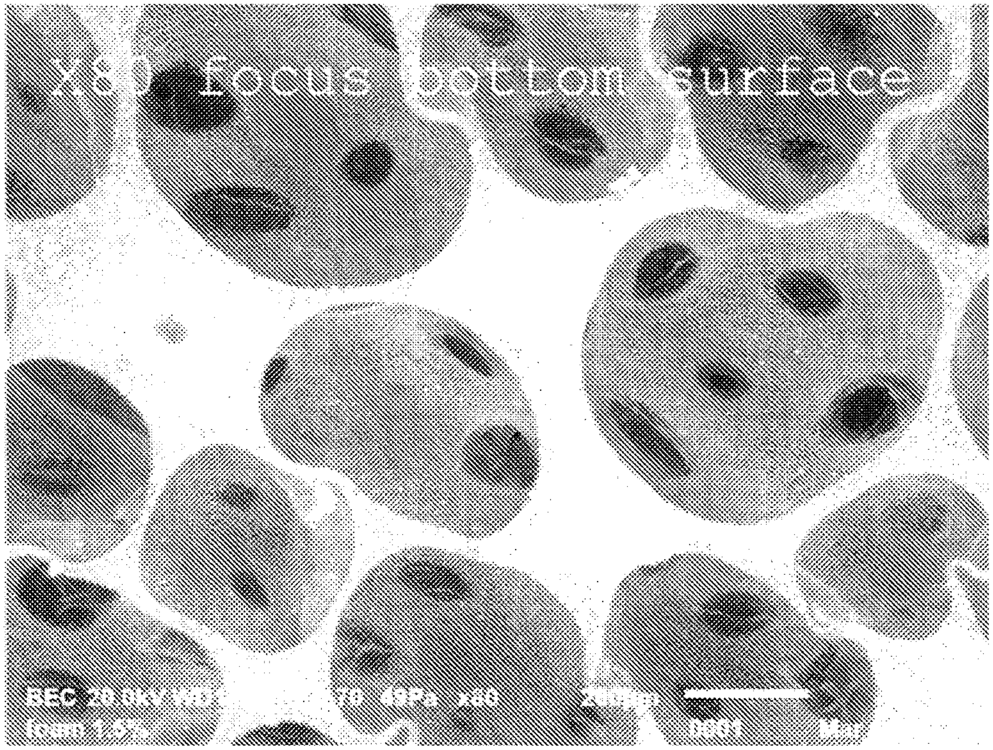

In the following description, various aspects of the present application will be described. For purposes of explanation, specific configurations and details are set forth in order to provide a thorough understanding of the present application. However, it will also be apparent to one skilled in the art that the present application may be practiced without the specific details presented herein. Furthermore, well-known features may be omitted or simplified in order not to obscure the present application.

The term "comprising", used in the claims, is "open ended" and means the elements recited, or their equivalent in structure or function, plus any other element or elements which are not recited. It should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a method comprising the steps x and z" should not be limited to methods consisting only of these steps.

Unless specifically stated, as used herein, the term "about" is understood as within a range of normal tolerance in the art, for example within two standard deviations of the mean. In one embodiment, the term "about" means within 10% of the reported numerical value of the number with which it is being used, preferably within 5% of the reported numerical value. For example, the term "about" can be immediately understood as within 10%, 9%, 8%, 7%, 6%, 5%, 4%, 3%, 2%, 1%, 0.5%, 0.1%, 0.05%, or 0.01% of the stated value. In other embodiments, the term "about" can mean a higher tolerance of variation depending on for instance the experimental technique used. Said variations of a specified value are understood by the skilled person and are within the context of the present invention. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges, for example from 1-3, from 2-4, and from 3-5, as well as 1, 2, 3, 4, 5, or 6, individually. This same principle applies to ranges reciting only one numerical value as a minimum or a maximum. Unless otherwise clear from context, all numerical values provided herein are modified by the term "about". Other similar terms, such as "substantially", "generally", "up to" and the like are to be construed as modifying a term or value such that it is not an absolute. Such terms will be defined by the circumstances and the terms that they modify as those terms are understood by those of skilled in the art. This includes, at very least, the degree of expected experimental error, technical error and instrumental error for a given experiment, technique or an instrument used to measure a value.

As used herein, the term "and/or" includes any and all combinations of one or more of the associated listed items. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The present application provides a method for manufacturing antimicrobial copper-containing polyurethane foams comprising the following steps:

Ia. Providing microparticles of metallic copper (Cu), cuprous oxide ($Cu_2O$), cupric oxide (CuO), or cuprous iodide (CuI), or combinations thereof, having size of 100 nm to 5 μm, and alkylammonium salt copolymer; or Ib. Providing a polyurethane liquid additive obtained according to the following steps:

A. Mixing dried microparticles of metallic copper (Cu), cuprous oxide ($Cu_2O$), cupric oxide (CuO), or cuprous iodide (CuI), or combinations thereof, having size of 100 nm to 5 μm with alkylammonium salt copolymer and polyol to a final concentration in the range of about 5-80% w/w of Cu, $Cu_2O$, CuO or CuI, or combinations thereof, to produce a suspension of the copper-containing microparticles in polyol;

B. Stirring said suspension to obtain a dispersion of the copper-containing microparticles in polyol; and C. Cooling the dispersion and drying it by evaporating air from said dispersion in vacuum, thereby forming a semi-solid concentrate of a polyurethane liquid additive;

II. Mixing said microparticles of Cu, $Cu_2O$, CuO, or CuI, or combinations thereof, and alkylammonium salt copolymer of Step (la), or said polyurethane liquid additive obtained in Step (Ib), with a polyol to any 2× desired final concentration of Cu, $Cu_2O$, CuO or CuI; and III. Introducing isocyanate into the resulted polyol mixture of Step (II), thereby forming a stable polyurethane foam, in which the microparticles of Cu, $Cu_2O$, CuO or CuI, or combinations thereof, are homogenously embedded and distributed throughout the formed polymeric matrix of said foam.

By combining the copper-containing particles mixture or copper-containing polyurethane liquid additive with isocyanate in Step (III), a stable polyurethane polymer is formed, in which the particles of Cu, $Cu_2O$, CuO, CuI, or combinations thereof, are homogenously embedded throughout the polymeric matrix. It should be noted that the homogenous distribution of the copper-containing microparticles is unique and can be achieved only by the method of the present invention, as opposed to prior art methodologies that do not use the liquid dispersant technology of the present invention. The polymeric matrix of the polyurethane foam with homogeneously distributed particles is seen in FIGS. 1*a*-1*d*, which show the scanning electronic microscope (SEM) images of the copper-containing polyurethane foam prepared by the method of the present invention, at four different magnifications.

Impregnation of Cu, $Cu_2O$, CuO or CuI microparticles in polyurethane foams creates the foams with potent antimicrobial properties. It is therefore the major aspect of the present invention to create such foams. The method of the present invention is based on the reaction of polyols with an isocyanate containing one, two or more isocyanate groups per molecule to form the polyurethane foam according to the following reaction scheme:

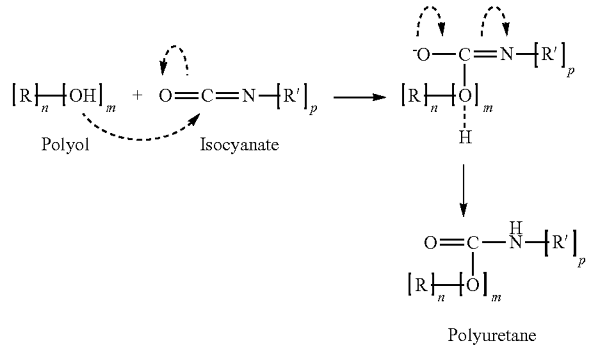

As defined in the present invention, "polyol" is any linear-chain or branched organic compound polyol containing at least two hydroxyl groups per molecule. Non-limiting examples of polyols used in the present invention are pentaerythritol, xylitol, maltitol, sorbitol, polyethylene glycol (PEG), polypropylene glycol (PPG), glycerol, polyvinyl alcohol and polymeric polyols, such as polyether polyol and polyester polyol. The last two polymeric polyols are preferable in manufacturing the polyurethane foams of the present invention.

As defined in the present invention, isocyanate can contain one, two or more isocyanate groups per molecule, preferably two groups (diisocyanates). Non-limiting examples of diisocyanates used in the present invention are aromatic diisocyanates, such as diphenylmethane diisocyanate (MDI) and toluene diisocyanate (TDI), and aliphatic diisocyanates, such as hexamethylene diisocyanate (HDI) and isophorone diisocyanate (IPDI).

The alkylammonium salt copolymer used in the method of the present invention is an additive that acts as a binder between the liquid matrix and the copper-containing particles. This binding is required in order to improve the particles dispersion, improve the antibacterial efficiency, prevent settling of the particles, and actually endow the polyurethane liquid additive, which is obtained in Step C of the method in the form of a liquid paste or liquid concentrate, with a much longer shelf life. The high-molecular weight alkylammonium salt copolymer is designed for high efficiency in liquid concentrates while maintaining migration to the surface of the final product to the minimum.

Figure 2A:
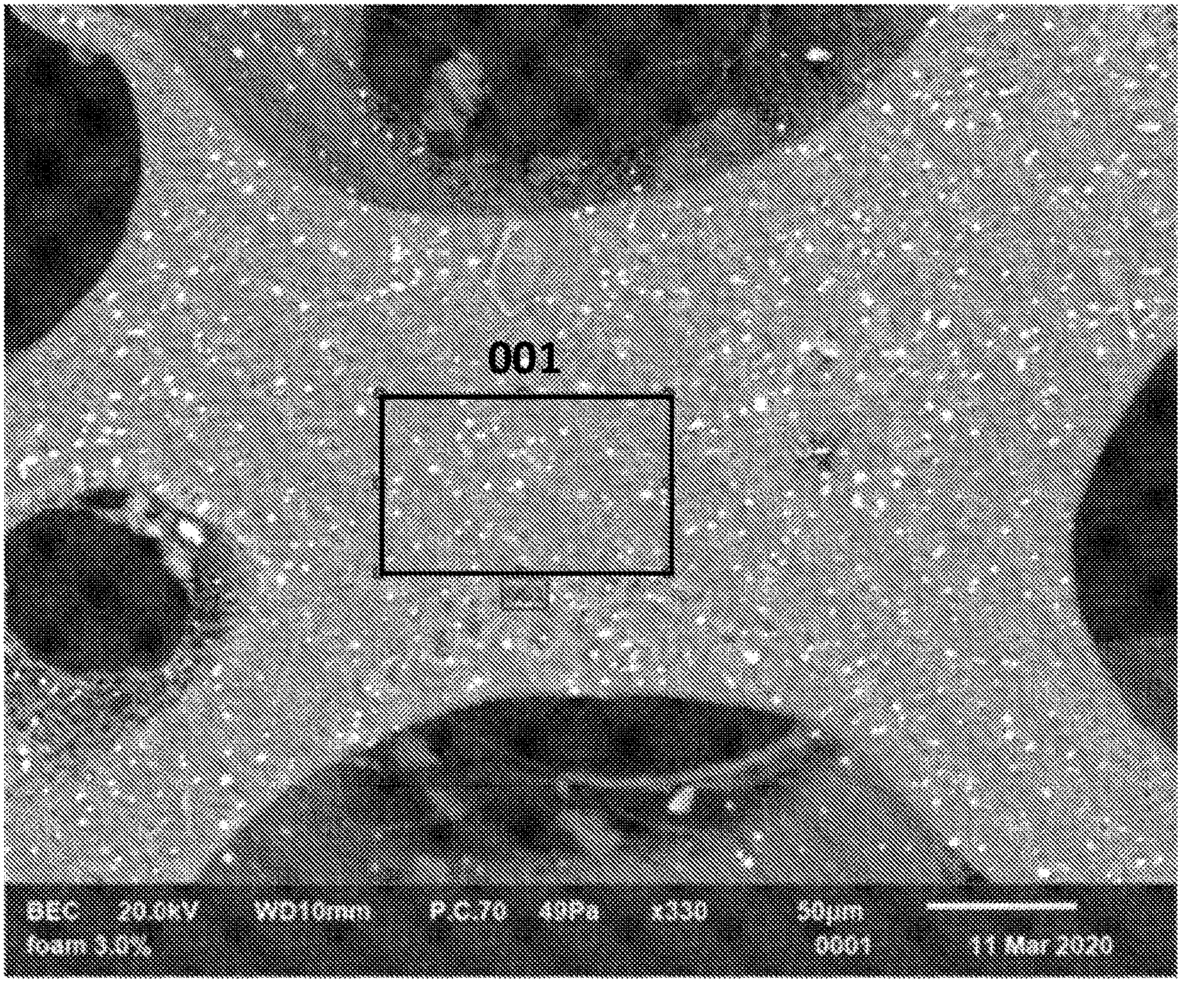
FIG. 2*a* shows the energy-dispersive X-ray spectroscopy (EDS) image of the copper-impregnated foam manufactured by the method of the present invention, at a 330 SEM magnification.
Figure 2B:
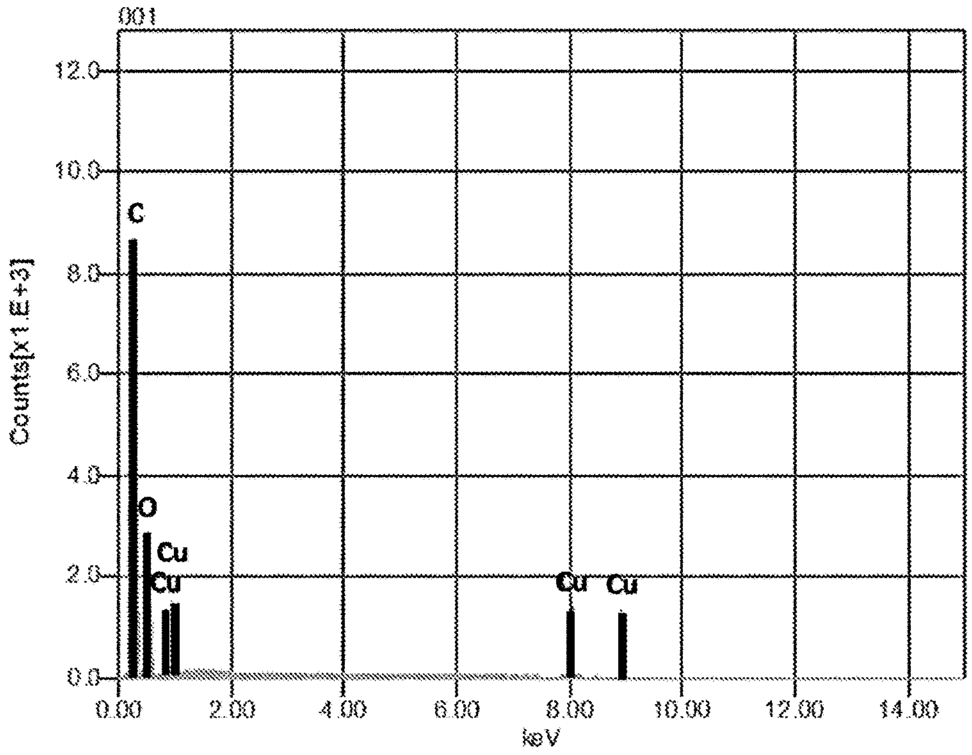
FIG. 2*b* shows the EDS analysis of the copper-impregnated foam shown in FIG. 2*a* and manufactured by the method of the present invention.
Figure 2C:
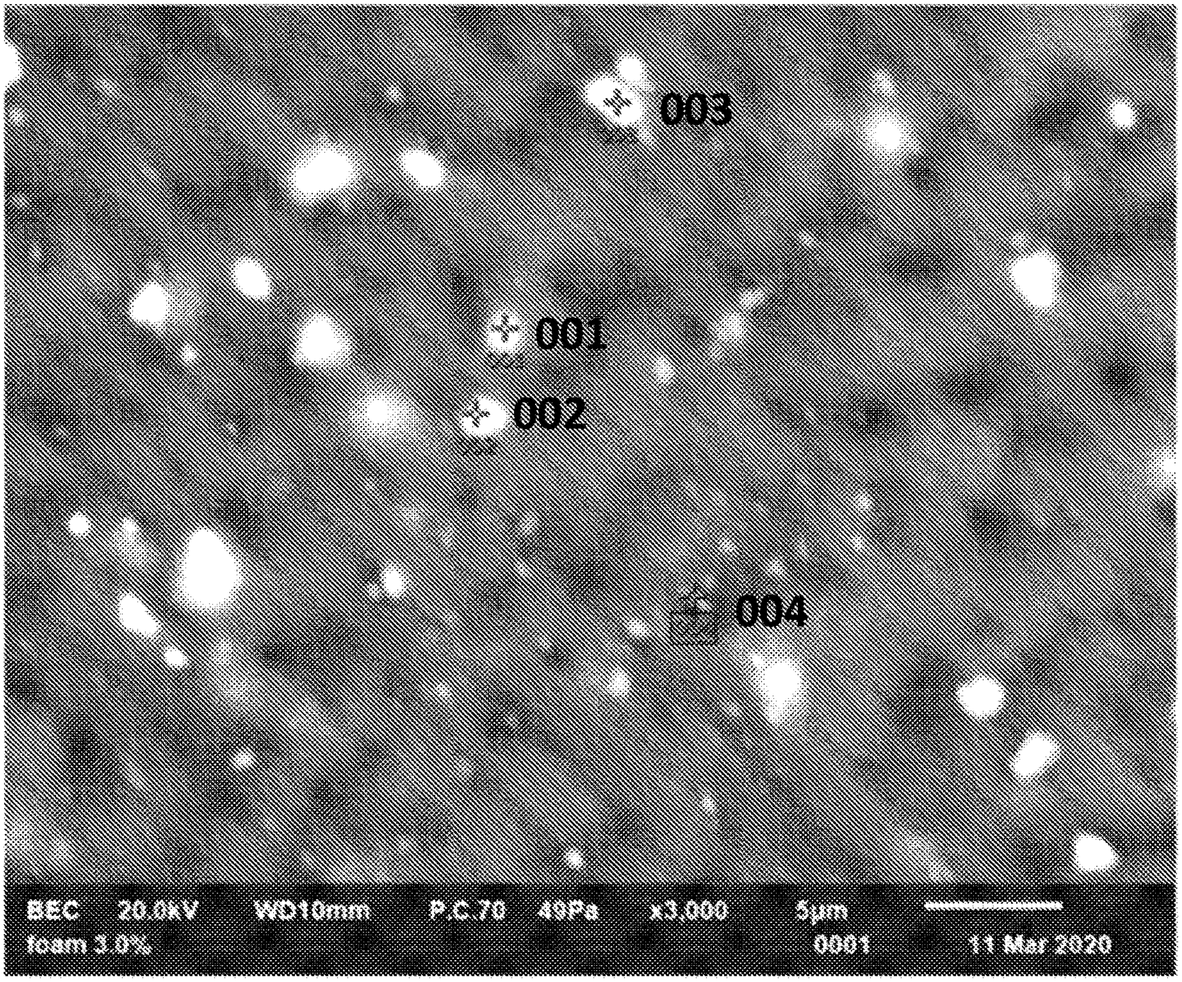
FIG. 2*c* shows the energy-dispersive X-ray spectroscopy (EDS) image of the copper-impregnated foam manufactured by the method of the present invention, at a 3330 SEM magnification.

In FIG. 2*a* showing the energy-dispersive X-ray spectroscopy (EDS) image of the foam impregnated with copper-containing particles and manufactured by the method of the present invention, at a 330 SEM magnification, the white dots are the copper-containing microparticles. FIG. 2*b* shows the EDS analysis of the copper-containing foam shown in FIG. 2*a* and manufactured by the method of the present invention. FIG. 2*c* shows the energy-dispersive X-ray spectroscopy (EDS) image of the copper-impregnated foam manufactured by the method of the present invention, at a 3330 SEM magnification. The following Table 1 shows the EDS analytical results of specific white dots relating to the copper-containing microparticles embedded in the foam shown in FIG. 2*c*. The presence of copper can be clearly seen.

TABLE 1

| Sample (white dot) | Oxygen content (O) | Carbon content (C) | Calcium content (Ca) | Copper content (Cu) |
|---|---|---|---|---|
| 001 | 20.53 | 62.04 | | 17.42 |
| 002 | 22.53 | 59.09 | | 18.38 |
| 003 | 17.31 | 55.38 | | 27.31 |
| 004 | 34.33 | 62.79 | 1.69 | 1.18 |
| Average | 23.68 | 59.83 | 1.69 | 16.07 |
| Deviation | 7.42 | 3.37 | 0.00 | 10.88 |

EXAMPLES

In the present example, foams containing 1.5% and 3% $Cu_2O$ microparticles were tested, according to the American Association of Textile Chemists and Colorists (AATCC) Test Method 100, designed to test the antimicrobial efficacy of fabrics. Both the 1.5% and 3% cuprous oxide microparticles reduced the titers of *Escherichia coli* and *Klebsiella pneumonia* bacteria by more than 99.96% (by more than 3.31 logs).

The experiment is detailed below. Briefly, a fresh transplant was taken from a stock culture of the test microorganism and grown overnight at 37±2° C. in Tryptone Soya Broth (TSB). A standard plate count was performed to determine the bacterial population titer. The microorganism population titer was adjusted to $2\text{-}4\times10^7$ colony forming units (CFU) per ml. 200 μl of the microbial solution was then added to the swatches as shown in Table 2 below, making sure that all liquid was completely absorbed into the control and test samples.

TABLE 2

| Article | Vessel Number | Bacteria |
|---|---|---|
| 1.5% Cu Foam | 1 | *E. Coli* |
| | 2 | |
| 3% Cu Foam | 3 | |
| | 4 | |
| Regular Foam | 5 | |
| | 6 | |
| 1.5% Cu Foam | 7 | *K. pneumonia* |
| | 8 | |
| 3% Cu Foam | 9 | |
| | 14 | |
| Regular Foam | 15 | |
| | 18 | |

The vessels were closed and placed for incubation at 37° C. After 3 hours of incubation, 50 ml of the stop solution (DeyEngley (D/E) Broth) was added to all vessels. The swatches with the stop solution were then transferred from all vessels to sterile stomager bags and the bags were stomached (mixed thoroughly) for 2 minutes to allow the bacteria to detach from the foams to the liquids. Then, from each liquid sample, 10 μl, 100 μl, and 1 ml aliquots were filtered through 0.45 μm filter membranes (Millipore catalogue number EZHAWG474). The membranes with the bacteria were placed on selective agar media (Chromagar Orientation®) and incubated at 37° C. After overnight incubator, the CFU in each plate were counted.

The log reduction calculations were determined using the following formula: log A-log B=log reduction, where A is the average colony forming units of the duplicate inoculum samples recovered from the "Time 0" samples (initial inoculum), and B is the average colony forming units of the duplicate inoculum samples recovered from "Time 3" hours respective samples. The log reduction was also compared to the 0% control foams without copper.

Table 3 below summarizes the experimental results, which were generated for the titers of *Escherichia coli* and *Klebsiella pneumonia* bacteria with the polyurethane foams of the present invention.

TABLE 3

*E. Coli*, Initial Inocula (A): 101,666 CFU (log = 5.01)
*K. pneumonia*, Initial Inocula (A): 221000 (log = 5.34)

| Bacteria | Foam | Replicate | Final Titer CFU | Final Titer $Log_{10}$ | Mean $Log_{10}$ | Log Reduction compared to "time 0" | Log Reduction compared to 0% Control Foam |
|---|---|---|---|---|---|---|---|
| *E. Coli* | 1.5% | 1 | <50 | <1.70 | <1.70 | >3.31 | >99.96 |
| | | 2 | <50 | <1.70 | | | |
| | 3% | 1 | <50 | <1.70 | <1.70 | >3.31 | >99.96 |
| | | 2 | <50 | <1.70 | | | |
| | 0% | 1 | 130000 | 5.11 | 5.06 | −0.11 | — |
| | | 2 | 100000 | 5.00 | | | |
| *K. pneumonia* | 1.5% | 1 | <50 | <1.70 | <1.70 | >3.65 | >99.98 |
| | | 2 | <50 | <1.70 | | | |
| | 3% | 1 | <50 | <1.70 | <1.70 | >3.65 | >99.98 |
| | | 2 | <50 | <1.70 | | | |
| | 0% | 1 | 230000 | 5.36 | 5.30 | −0.02 | — |
| | | 2 | 170000 | 5.23 | | | |

The results presented in Table 3 above clearly show that the polyurethane foams obtained by the method of the present invention reduce the bacterial titers by more than 99.9%, as compared to the initial inoculum, and as compared to the control foams without copper.

While certain features of the present application have been illustrated and described herein, many modifications, substitutions, changes, and equivalents will be apparent to those of ordinary skill in the art. It is, therefore, to be understood that the appended claims are intended to cover all such modifications and changes as fall within the true spirit of the present application.

The invention claimed is:

1. A method for manufacturing antimicrobial polyurethane foams, said polyurethane foams embedding homogeneously distributed copper-containing microparticles, said method comprising:

Providing a polyurethane liquid additive obtained according to a method comprising:

A. Mixing dried microparticles of metallic copper (Cu), cuprous oxide ($Cu_2O$), cupric oxide (CuO), or cuprous iodide (CuI), or combinations thereof, having size of 100 nm to 5 μm with alkylammonium salt copolymer and polyol to a final concentration in the range of about 5-80% w/w of Cu, $Cu_2O$, CuO or CuI, or combinations thereof, to produce a suspension of the copper-containing microparticles in polyol;

B. Stirring said suspension to obtain a dispersion of the copper-containing microparticles in polyol; and C. Cooling the dispersion and drying it by evaporating air from said dispersion in vacuum, thereby forming a semi-solid concentrate of a polyurethane liquid additive;

II. Mixing said polyurethane liquid additive obtained in Step (Ib), with additional polyol to form a polyol mixture having a desired concentration of Cu, $Cu_2O$, CuO or CuI; and III. Introducing isocyanate into the resulted polyol mixture of Step (II), thereby forming a stable polyurethane foam, in which the microparticles of Cu, $Cu_2O$, CuO or CuI, or combinations thereof, are homogenously embedded and distributed throughout the formed polymeric matrix of said foam.

2. The method of claim 1, wherein said microparticles are metallic copper (Cu) microparticles, and the resulted polyurethane foam contains the Cu microparticles embedded and homogenously distributed throughout the formed polymeric matrix of said foam.

3. The method of claim 1, wherein said microparticles are cuprous oxide ($Cu_2O$) microparticles, and the resulted polyurethane foam contains the $Cu_2O$ microparticles embedded and homogenously distributed throughout the formed polymeric matrix of said foam.

4. The method of claim 1, wherein said microparticles are cupric oxide (CuO) microparticles, and the resulted polyurethane foam contains the CuO microparticles embedded and homogenously distributed throughout the formed polymeric matrix of said foam.

5. The method of claim 1, wherein said microparticles are cuprous iodide (CuI) microparticles, and the resulted polyurethane foam contains the CuI microparticles embedded and homogenously distributed throughout the formed polymeric matrix of said foam.

6. The method of claim 1, wherein said microparticles contain any mixture selected from $Cu/Cu_2O$, Cu/CuO, Cu/CuI, $Cu_2O/CuO$, $Cu_2O/CuI$, CuO/CuI, $Cu/Cu_2O/CuO$, $Cu/Cu_2O/CuI$, $Cu/CuO/CuI$, $Cu_2O/CuO/CuI$, and $Cu/Cu_2O/CuO/CuI$, and the resulted polyurethane foam contains any microparticles combination selected from the $Cu/Cu_2O$, $Cu/CuO$, $Cu/CuI$, $Cu_2O/CuO$, $Cu_2O/CuI$, $CuO/CuI$, $Cu/Cu_2O/CuO$, $Cu/Cu_2O/CuI$, $Cu/CuO/CuI$, $Cu_2O/CuO/CuI$, and $Cu/Cu_2O/CuO/CuI$ microparticles embedded and homogenously distributed throughout the formed polymeric matrix of said foam.

7. The method of claim 1, wherein said polyol is selected from xylitol, maltitol, sorbitol, polyethylene glycol (PEG), polypropylene glycol (PPG), glycerol, polyvinyl alcohol and polymeric polyols, such as polyether polyol and polyester polyol, or combinations thereof.

8. The method of claim 7, wherein said polyol is polyethylene glycol (PEG) or polypropylene glycol (PPG).

9. The method of claim 1, wherein said isocyanate is selected from diisocyanates.

10. The method of claim 9, wherein said diisocyanate is selected from aromatic diisocyanates and aliphatic diisocyanates.

11. The method of claim 10, wherein said aromatic diisocyanate is diphenylmethane diisocyanate (MDI) or toluene diisocyanate (TDI).

12. The method of claim 10, wherein said aliphatic diisocyanate is hexamethylene diisocyanate (HDI) or isophorone diisocyanate (IPDI).

* * * * *